US012528305B2

(12) United States Patent
Kojima et al.

(10) Patent No.: US 12,528,305 B2
(45) Date of Patent: Jan. 20, 2026

(54) PRINTER, PRINTING SYSTEM, AND STORAGE MEDIUM

(71) Applicant: SATO HOLDINGS KABUSHIKI KAISHA, Tokyo (JP)

(72) Inventors: Michitaka Kojima, Tokyo (JP); Kazuhito Wakamatsu, Tokyo (JP)

(73) Assignee: SATO CORPORATION, Tokyo (JP)

( * ) Notice: Subject to any disclaimer, the term of this patent is extended or adjusted under 35 U.S.C. 154(b) by 213 days.

(21) Appl. No.: 18/267,068

(22) PCT Filed: Nov. 10, 2021

(86) PCT No.: PCT/JP2021/041328
§ 371 (c)(1),
(2) Date: Jun. 13, 2023

(87) PCT Pub. No.: WO2022/180940
PCT Pub. Date: Sep. 1, 2022

(65) Prior Publication Data

US 2024/0042781 A1 Feb. 8, 2024

(30) Foreign Application Priority Data

Feb. 26, 2021 (JP) ................................ 2021-029779

(51) Int. Cl.
*B41J 29/393* (2006.01)

(52) U.S. Cl.
CPC ...... *B41J 29/393* (2013.01); *B41J 2029/3932* (2013.01)

(58) Field of Classification Search
CPC .... B41J 29/393; B41J 2029/3932; B41J 2/32; B41J 3/4075
See application file for complete search history.

(56) References Cited

U.S. PATENT DOCUMENTS

2009/0231381 A1* 9/2009 Someno ................ G03G 15/80 347/19
2017/0080727 A1 3/2017 Satake et al.
2022/0075568 A1 3/2022 Inagaki

FOREIGN PATENT DOCUMENTS

JP H10-207585 A 8/1998
JP 2000-272210 A 10/2000
(Continued)

OTHER PUBLICATIONS

Extended European Search Report issued in connection with EP Appl. No. 21928035.1 dated Sep. 30, 2024.

*Primary Examiner* — Justin Seo
(74) *Attorney, Agent, or Firm* — Foley & Lardner LLP

(57) ABSTRACT

A printer for issuing print media includes: a rechargeable battery configured to supply power to the printer; a print unit configured to print information on the print media; a display unit; and a control unit configured to: compute "A" based on: a decrease in remaining battery capacity of the battery during a period of time from a reference time to the present time, and a total number of print media that have been issued during the period of time, where "A" is defined as remaining battery capacity of the battery decreased as a single print medium is issued; compute (B−C)/A to obtain a number of print media on which the print unit can print, where "B" is defined as present remaining battery capacity, and "C" is defined as a lower limit of remaining battery capacity of the battery; and control the display unit to display the number of print media.

9 Claims, 12 Drawing Sheets

(56) References Cited

FOREIGN PATENT DOCUMENTS

| | | | | |
|---|---|---|---|---|
| JP | 2010-058292 | A | | 3/2010 |
| JP | 2010-149451 | A | | 7/2010 |
| JP | 2010-244281 | A | | 10/2010 |
| JP | 2013203012 | A | * | 10/2013 |
| JP | 2015-107564 | A | | 6/2015 |
| JP | 2017-056698 | A | | 3/2017 |
| JP | 2020-104380 | A | | 7/2020 |
| WO | WO-2012/056032 | A1 | | 5/2012 |

* cited by examiner

| Tag ID | Label type | Voltage consumed per single label (V) |
|---|---|---|
| 001 | AA | 0.11 |
| 002 | BB | 0.12 |
| 003 | CC | 0.14 |
| ⋮ | ⋮ | ⋮ |

101

Label Database

PRINTER, PRINTING SYSTEM, AND STORAGE MEDIUM

FIELD

The present disclosure relates to a printer, a print system, and a recording medium.

BACKGROUND

In recent years, a rechargeable battery (also referred to as a secondary battery) such as a lithium-ion battery has been applied to a relatively small printer (see Japanese Laid-open patent publication JP2010-58292 for example).

BRIEF SUMMARY

Technical Problem

While a user brings outside a printer having a rechargeable battery and uses the printer outside, power of the battery is consumed as the printer issues print media such as business forms. Consequently, the user may have a worry about print quality deterioration of the print media or incapability of issuing a print medium due to too low remaining battery capacity.

In view of the above, the present invention aims to notify a user of a number of print media on which a printer equipped with a rechargeable battery is able to print.

Solution to Problem

An embodiment of the present invention is a printer for issuing print media, including: a rechargeable battery configured to supply power to the printer; a print unit configured to print information on each of the print media; a display unit; and a control unit. The control unit is configured to: compute "A" based on: a decrease in remaining battery capacity of the battery during a period of time from a reference time to the present time, and a total number of print media that have been issued during the period of time, where "A" is defined as remaining battery capacity of the battery decreased as a single print medium is issued; compute (B−C)/A to obtain a number of print media on which the print unit can print, where "B" is defined as present remaining battery capacity of the battery, and "C" is defined as a lower limit of remaining battery capacity of the battery; and control the display unit to display the number of print.

Advantageous Effects

The embodiment according to the present invention is capable of notifying a user of a number of print media on which a printer equipped with a rechargeable battery is able to print.

DETAILED DESCRIPTION

A printer having a rechargeable battery will be described below. The printer is configured to display a number of print media issuable, with remaining battery capacity of the battery.

In the present disclosure, "remaining battery capacity" means remaining capacity of a battery, and may be represented by a state of charge (SOC). An SOC is represented by "remaining capacity (Ah)/full charge capacity (Ah)*100." Methods for estimating an SOC are known such as a current integration method, and a method including estimating an open circuit voltage (OCV) from a battery voltage (namely, CCV (closed circuit voltage)) and then referring to a map data of SOC relative to OCV.

As there is generally one to one relation between a battery voltage and an SOC, "remaining battery capacity" in the present disclosure may be equivalent of a battery voltage. That is, it is possible to compute a number of print media issuable which a printer displays, even when a battery voltage is applied instead of an SOC.

More specifically, an embodiment of a method for computing the number of print media issuable may include: obtaining an SOC of a battery decreased as a single print medium is issued ("A"); and dividing the "A" by a margin for the present SOC of a battery (that is, the present SOC ("B") minus a lower limit of an SOC ("C")), that is, computing (B−C)/A. Then, the number of print media issuable is obtained.

Other embodiments of a method for calculating the number of print media issuable may include: obtaining a battery voltage decreased as a single print medium is issued ("A"); and dividing the "A" by a margin for the present battery voltage (that is, the present battery voltage ("B") minus a lower limit of a battery voltage ("C")), that is, computing (B−C)/A. Then, the number of print media issuable is obtained similarly.

Figure 1A:
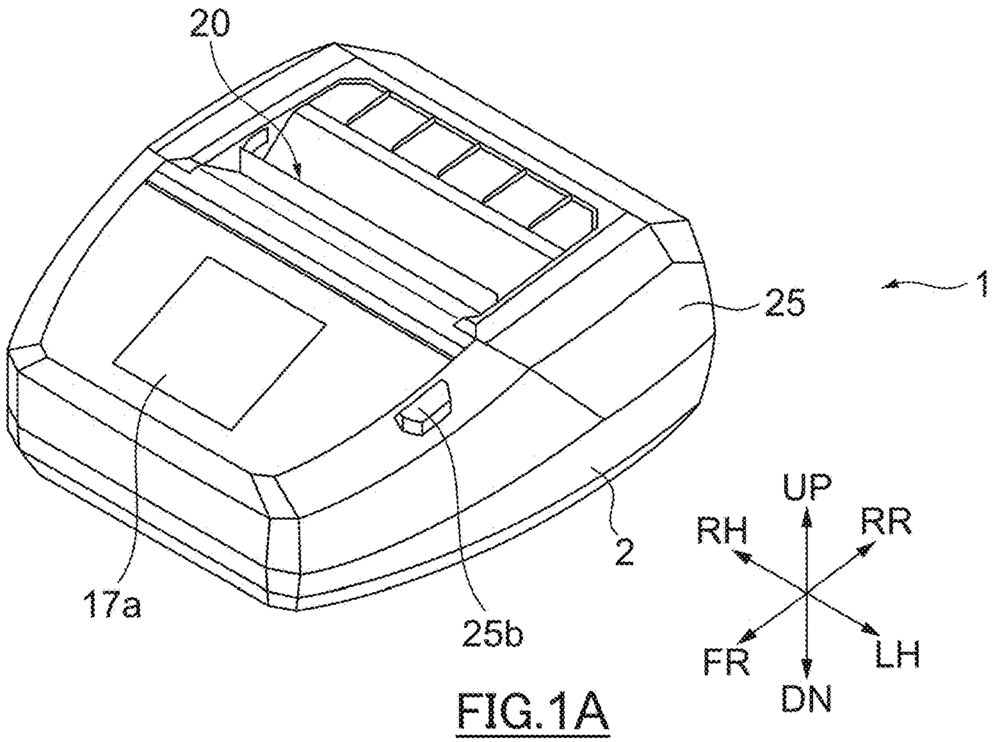
FIG. 1A is a perspective view of a printer with its cover closed according to an embodiment.
Figure 1B:
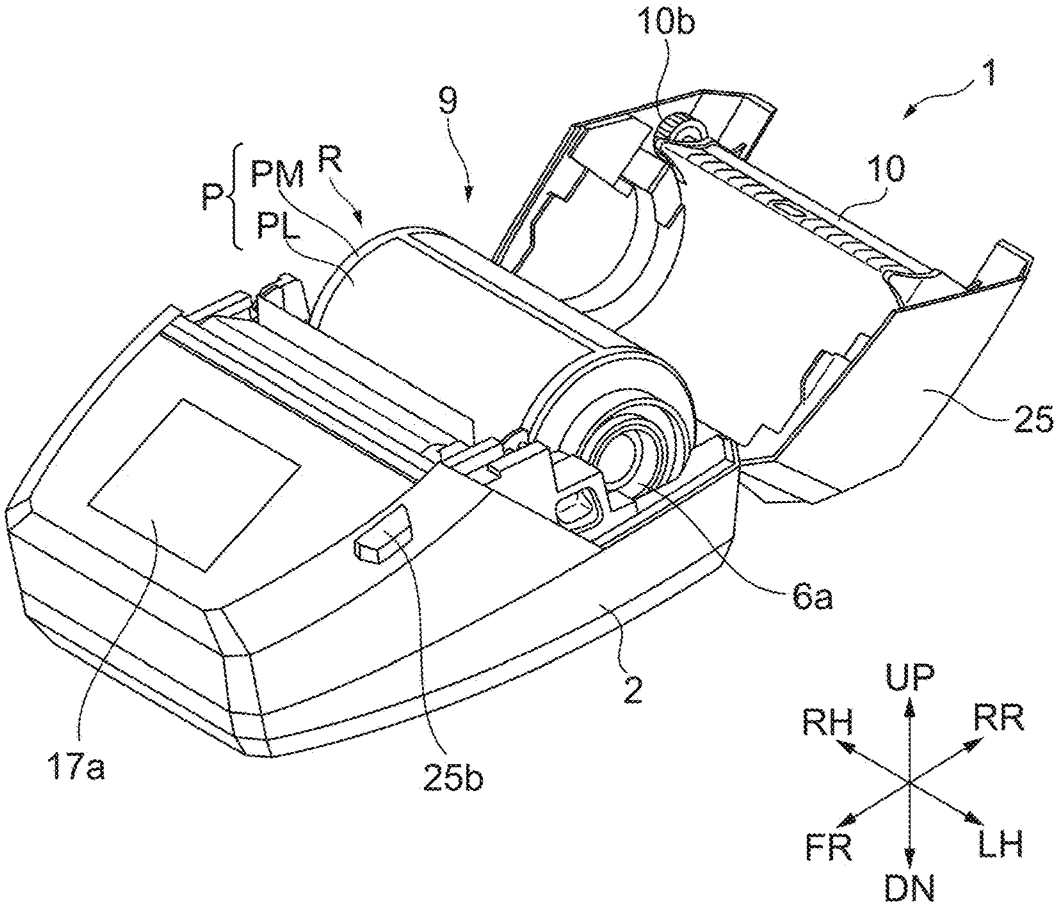
FIG. 1B is a perspective view of a printer with its cover opened according to an embodiment.
Figure 2:
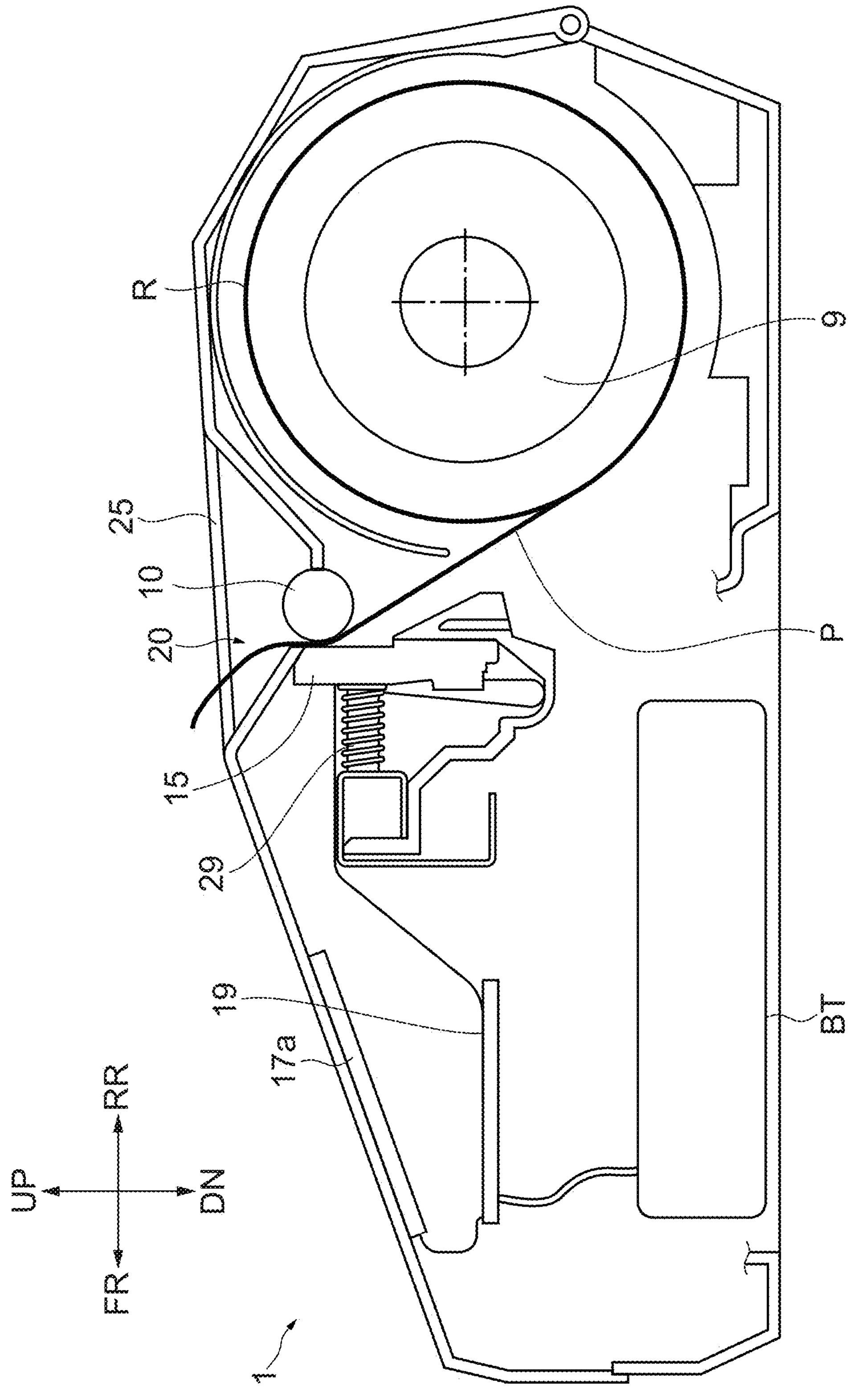
FIG. 2 is a sectional view of an outline of a printer according to an embodiment.

A printer 1 according to an embodiment of the present invention is shown in FIGS. 1A, 1B, and 2. The printer 1 is a thermal printer configured to print on a label having a thermosensitive color developing layer on one side.

In each of FIGS. 1A, 1B, and 2, an upward direction (UP), a downward direction (DN), a left direction (LH), a right direction (RH), a forward direction (FR), and a rearward direction (RR) are defined; however, the definition of directions are intended only for convenience in referring to the drawings. The definition is not intended to identify posture in use of the printer of the present invention.

According to the definition of directions, "a printer longitudinal direction" represents a forward direction and a rearward direction of the printer 1, and "a printer width direction" represents a left direction and a right direction, or a lateral direction of the printer 1.

Each of FIG. 1A and FIG. 1B is a perspective view of the printer 1 according to an embodiment. FIG. 1A shows the printer 1 with a printer cover 25 closed, while FIG. 1B shows the printer 1 with the printer cover 25 opened. FIG. 1B shows the printer 1 in which a paper roll R is set.

As shown in FIG. 1A, internal functional parts are protected by a body case 2 and the printer cover 25. An outlet 20 for ejecting labels is disposed at an upper face of the printer 1.

The printer 1 can be used with the outlet 20 directed upward (transverse posture). The printer 1 can be also used with a belt hook (not illustrated) on the bottom of the printer 1 hanging from a belt of a user, or can be used with a shoulder belt (not illustrated) hanged on a shoulder of a user so as to place the outlet 20 laterally (placing it vertically).

A display panel 17*a* is disposed at the front side of the outlet 20 of the body case 2. The display panel 17*a* may be comprised of a touch screen for entering an operation input by a user. The display panel 17*a* is connected to a circuit board inside the printer 1, and may output an image representing operating status of the printer 1 or user interface regarding operation to the printer 1.

The printer cover 25 is configured to swing between an open position for opening the inside of the printer 1 and a closed position for closing the inside of the printer 1.

When a cover open lever 25*b* disposed at the body case 2 is operated, the printer cover 25 is opened as shown in FIG. 1B. As the printer cover 25 is opened, a paper roll container 9 is exposed. The paper roll container 9 is a region in which a paper roll R is contained.

As shown in FIGS. 1B and 2, the paper roll R is a roll into which a belt-shaped long strip of continuous paper P is wound. The continuous paper P includes a belt-shaped liner PM and a plurality of labels PL temporarily adhering to the liner PM with predetermined intervals. The label attaching face of the liner PM is coated with a parting agent such as silicone for facilitating separation of the labels PL.

The front face of the label PL is a print surface on which information is printed. A thermosensitive color developing layer is formed on the front face of the label PL. When the temperature reaches a predetermined range, the thermosensitive color developing layer develops a specific color. The rear face of the print surface is an adhesion surface on which an adhesive agent is coated. The adhesion surface is attached to the label attaching face of the liner PM, and thereby the labels PL temporarily adhere to the liner PM.

In other embodiments, the continuous paper P may be a linerless label.

As shown in FIG. 1B, a pair of paper roll guides 6*a* is disposed in the paper roll container 9. The pair of paper roll guides 6*a* is configured to rotatably support the paper roll R while coming in contact with both end faces of the paper roll R in a width direction, so as to guide a continuous paper extracted from the paper roll R while the continuous paper is fed. Preferably, the pair of paper roll guides 6*a* is movably disposed along the width direction of the paper roll R so as to change its position in accordance with a width of the paper roll R.

As shown in FIG. 1B, a platen roller 10 is pivotally supported at the front end of the printer cover 25 so that the roller can rotate in a forward direction and a reverse direction. The platen roller 10 is a feed means configured to feed the continuous paper P extracted from the paper roll R. The platen roller 10 extends in the width direction of the continuous paper P. A gear 10*b* is connected to one end of a platen shaft of the platen roller 10. The gear 10*b* engages with a gear (not illustrated) disposed in the body case 2 when the printer cover 25 is closed. Via that gear disposed in the body case 2, the gear 10*b* is mechanically connected to a stepping motor (not illustrated) or the like for driving the roller.

The thermal head 15 is a print means to print information such as letters, symbols, graphics, barcodes, or the like on the label of the continuous paper P. The thermal head 15 is comprised of a plurality of heating elements (heating resistors) aligned along the width direction of the continuous paper P. The thermal head 15 performs printing by selectively applying current to the plurality of heating elements, based on a signal transmitted from the circuit board.

As shown in FIG. 2, when the printer cover 25 is closed, the thermal head 15 is positioned so as to face the platen roller 10, and nips the continuous paper P with the platen roller 10. A coil spring 29 is a biasing means to bias the thermal head toward the platen roller 10, thereby generating a proper nip pressure for printing between the thermal head 15 and the platen roller 10.

As shown in FIG. 2, a rechargeable battery BT is contained in a vicinity of a bottom portion of the printer 1. The printer 1 is configured such that the battery BT is rechargeable from commercial power supply via a charger (not illustrated). Terminals of the battery BT are connected to a circuit board 19.

Circuit components are implemented in the circuit board 19. The circuit components are configured to operate and control each unit of the printer 1. The circuit board 19 is configured to generate and supply voltages to each unit of the printer 1 such as the thermal head 15 and the display panel 17*a* so as to operate them.

Figure 3:
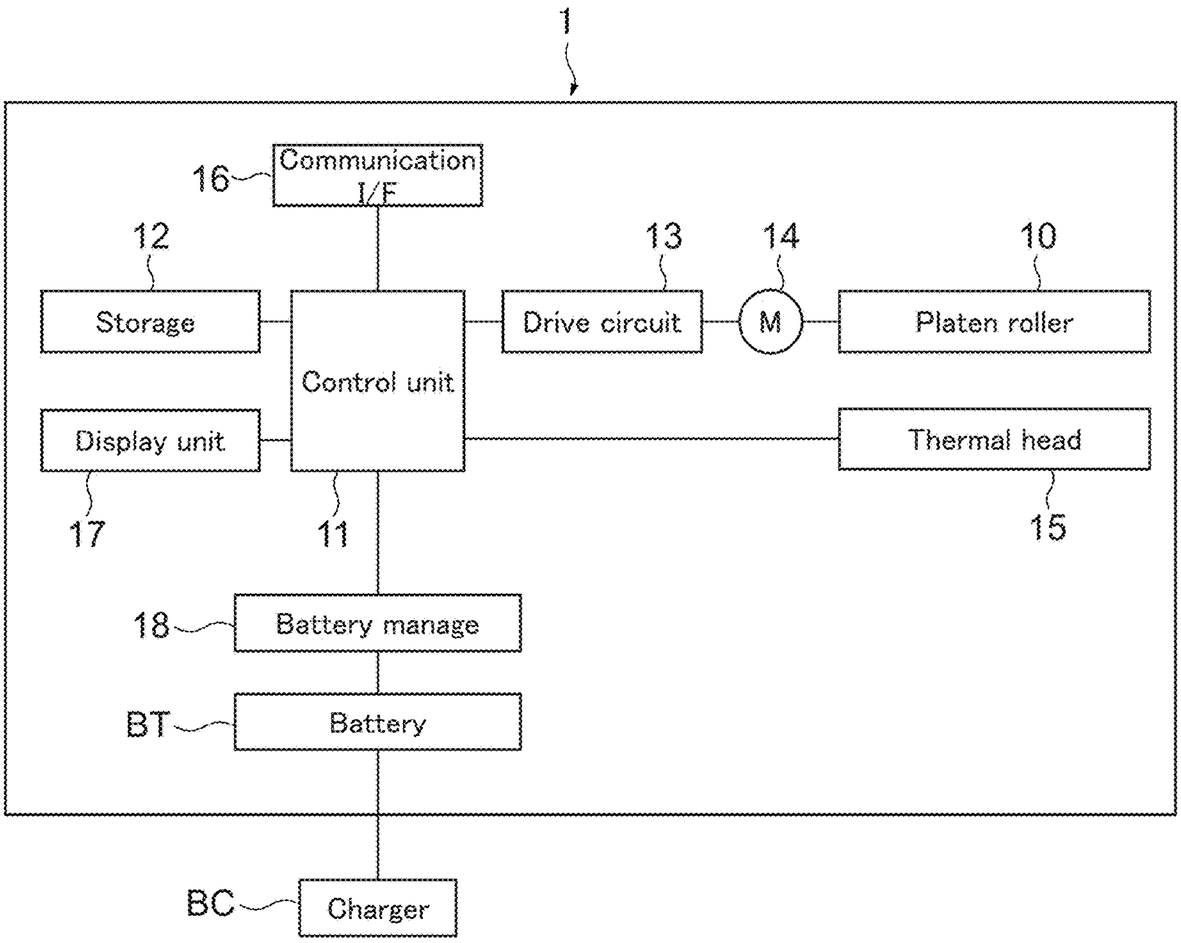
FIG. 3 is a block diagram to represent internal configuration of a printer according to an embodiment.

Next, an internal configuration of the printer 1 will be described with reference to FIG. 3. FIG. 3 is a block diagram to represent an internal configuration of the printer 1.

As shown in FIG. 3, the printer 1 includes: for example, a control unit 11; a storage 12; a driver circuit 13; the motor 14 which is mechanically connected to the platen roller 10; the thermal head 15; a communication interface (I/F) 16; a display unit 17; a battery manager 18; and the battery BT. The battery manager 28 may be integrated into the battery BT.

The control unit 11 is comprised of a microcomputer and memories (namely, a random access memory (RAM) and a read-only memory (ROM)) to control operations of the printer 2. For example, the microcomputer runs programs such as a firmware when the printer 1 is powered on, and performs a variety of controls including a feed control and a print control.

The storage 12 is a storage device such as a solid state drive (SDD). The storage 12 may store files for printing obtained from a host computer through the communication interface 16, for example. The storage 12 may store information of print format(s) applied when information is printed on each label.

The driver circuit 13 drives the motor 14 for controlling rotation of the platen roller 15, responsive to a feed request form the control unit 11. The motor 14 is a stepping motor, for example. The feed request includes, for example, information regarding a feed direction (namely, a forward direction or a reverse direction) and a feed distance (a number of steps, etc.).

The control unit 11 includes a circuit that causes current to selectively flow through each of a plurality of heating elements of the thermal head 15, based on each line data of print data. When the heating elements heated by the current are pushed to the label PL of the continuous paper CP fed by the platen roller 10, a color develops at a part of the continuous paper to which the heating elements are pushed, thereby printing information on the label PL of the continuous paper CP. A combination of the control unit 11 and the thermal head 15 is an example of a print unit.

The display unit 17 is comprised of the display panel 17*a* (see FIGS. 1A and 1B) and a drive circuit that drives the display panel 17*a* based on display data. The display panel 17*a* may be an LCD or an organic EL, etc.

In an embodiment, a touch screen for entering inputs is implemented.

The battery manager 18 is comprised of, for example, a voltage sensor, a current sensor, and a control circuit. The control circuit is configured to process detection signals from the sensors to compute and record an SOC of the battery BT. The voltage sensor is configured to detect a closed circuit voltage (that is, a battery voltage) of the battery BT. The current sensor is disposed on a line connected to one terminal of the battery BT to detect current that flows in the line.

The battery manager 18 transmits an SOC of the battery BT to the control unit 11, responsive to an instruction from the control unit 11, or at a predetermined time.

As the SOC is dependent on a temperature of the battery BT, the battery manager 18 may be further comprised of a temperature sensor and compute an SOC more accurately based on a detection value of the temperature sensor.

The battery BT can be charged when a user connects the both terminals of the battery BT in the printer 1, to a charger BC. For example, the charger BC is connected to commercial power supply such as 100V AC power supply with which the battery BT is charged.

Functions that are realized by execution of the firmware in the control unit 11 may include at least the following functions (i) and (ii):

(i) Obtaining an SOC and a battery voltage of the battery BT from the battery manager 18; and (ii) Computing a number-of-labels-issuable when condition(s) are satisfied, and controlling the display unit 17 to display the number-of-labels-issuable.

Figure 4:
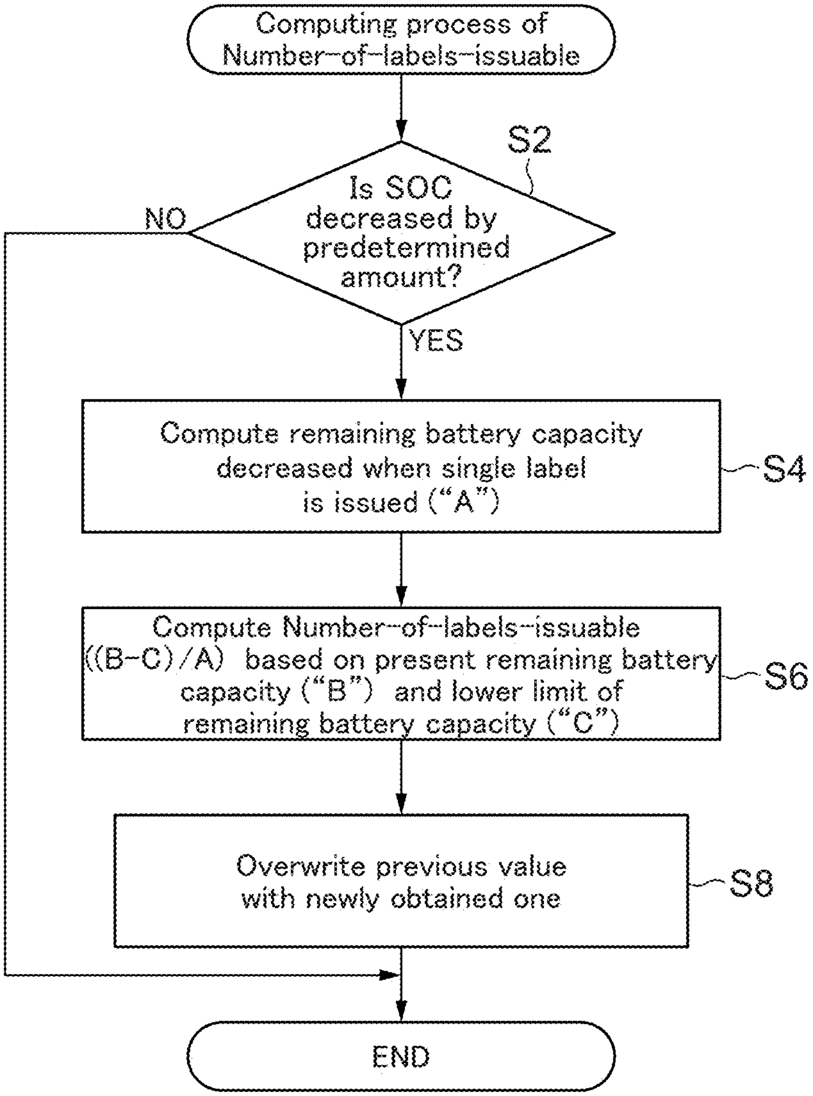
FIG. 4 is a flowchart indicating a computing process of a number-of-labels-issuable in a printer according to an embodiment.

Next, the computing process of a number-of-labels-issuable in (ii) noted above will be explained with reference to a flowchart of FIG. 4. Note that a process corresponding to each of a flowchart of FIG. 4 and flowcharts of FIGS. 6 and 8 (which will be described later) is performed by a microcomputer executing a program in the control unit 11.

A time when a number-of-labels-issuable is computed may be, but not limited to, every time an SOC of the battery BT is decreased by a predetermined amount. A case is simulated in FIG. 4 in which the controller unit 11 sequentially obtains an SOC that the battery manager 18 computes.

The controller unit 11 monitors whether an SOC, which sequentially obtains from the battery manager 18, has been decreased by a predetermined amount, from an SOC when the number-of-labels-issuable was previously computed. If the SOC has been decreased by the predetermined amount (step S2: YES), the controller unit 11 performs Step S4 and the subsequent steps.

Figure 5:
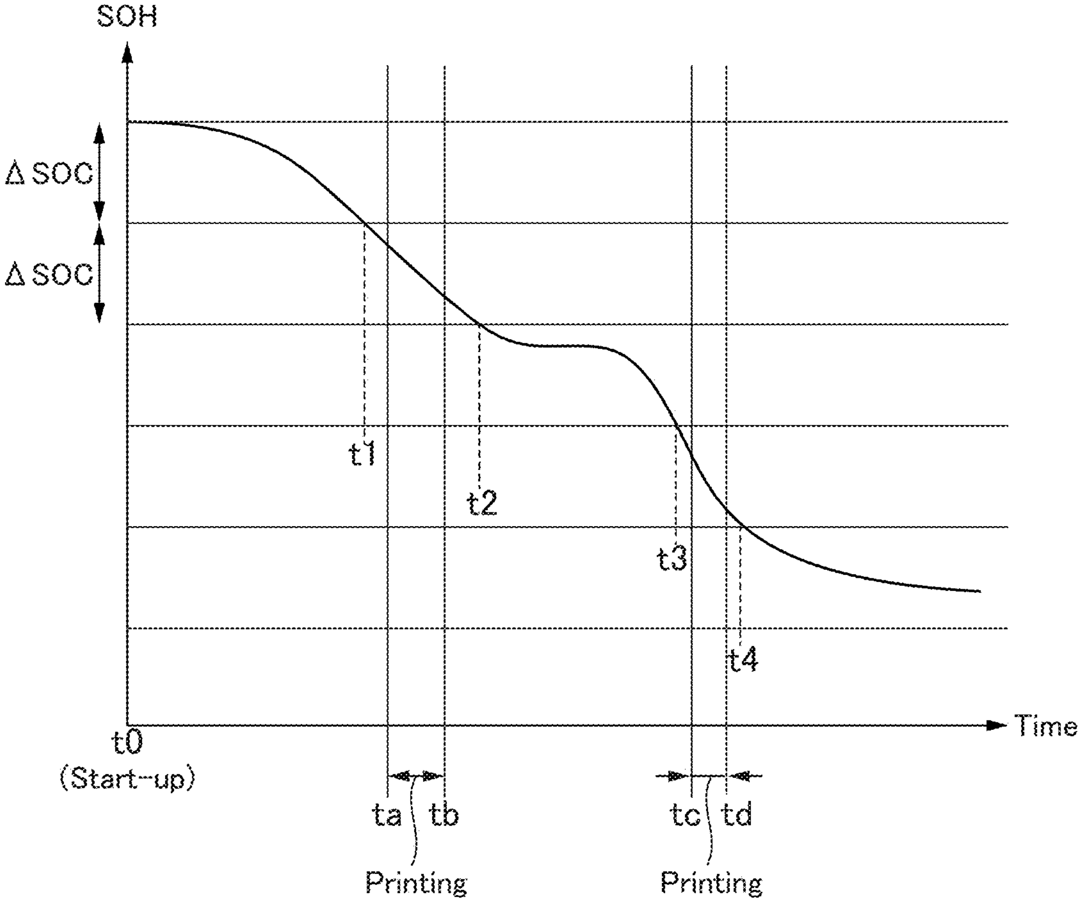
FIG. 5 represents a time when a number-of-labels-issuable is computed in a printer according to an embodiment.

In an embodiment, the controller unit 11 obtains an SOC from the battery manager 18, as a reference value, when the printer 1 is powered on, and performs Step S4 and the subsequent steps every time an SOC is decreased by the predetermined amount. FIG. 5 represents an example of variation in SOC over time, from a time when the printer 1 is powered on. In the example of FIG. 5, Step S4 and the subsequent steps are performed at times t1, t2, t3, t4, . . . when an SOC is sequentially decreased by ΔSOC from a start-up time t0.

First, the control unit 11 computes remaining battery capacity decreased when a single label is issued (that is, per single label) ("A") (Step S4). The decreased remaining battery capacity ("A") per single label may be a decreased battery voltage, or may be a decrease SOC.

A decrease in remaining battery capacity per single label is a value obtained by dividing the remaining battery capacity that is decreased to the present time after the printer 1 is powered on, by a number of labels that have been issued to the present time after the printer 1 is powered on.

Next, the control unit 11 computes a number-of-labels-issuable based on: the decrease in the remaining battery capacity per single label ("A"), which is obtained at Step S4; present remaining battery capacity ("B"); and a lower limit of remaining battery capacity ("C") (Step S6).

The lower limit of remaining battery capacity ("C") may be set as appropriate, and may be a value corresponding to a low battery voltage of the battery BT such that the printer 1 is unable to perform regular operations. The lower limit of remaining battery capacity ("C") is recorded in the control unit 11. The number-of-labels-issuable is obtained by computing (B−C)/A at Step S6.

The control unit 11 overwrites a previous number-of-labels-issuable with the newly obtained one (Step S8).

Referring again to FIG. 5, the example is shown in a case where printing has been performed during a period from a time "ta" to a time "tb" and a period from a time "tc" to a time "td", after the start-up of the printer 1. In FIG. 5, a number-of-labels-issuable computed at each of times t1 to t4 is shown as an example. In this example, a voltage consumed per label for the battery BT is computed as a decrease in remaining battery capacity ("A") per label. It is assumed in this example that a lower limit of the battery is 13V as a lower limit of remaining battery capacity ("C").

TABLE 1

| Time | t0 | t1 | t2 | t3 | t4 |
|---|---|---|---|---|---|
| B: Present battery voltage | 16.8 V | 16.3 V | 15.8 V | 15.3 V | 14.8 V |
| ΔV: Decrease in battery voltage from start-up time | — | 0.5 V | 1.0 V | 1.5 V | 2.0 V |
| P: Total number of printed labels from start-up time | — | 0 pcs | 11 pcs | 11 pcs | 14 pcs |
| A: Voltage consumed per label (=ΔV/P) | — | 0 V | 0.091 V | 0.136 V | 0.143 V |

TABLE 1-continued

| Time | t0 | t1 | t2 | t3 | t4 |
|---|---|---|---|---|---|
| N: Number-of-labels-issuable (=(B-C)/A) | — | 0 pcs | 31 pcs | 16 pcs | 13 pcs |

The number-of-labels-issuable according to the above-referenced computation equation (that is, the number-of-labels-issuable is equal to (B−C)/A) is incomputable in a case where the total number of printed labels from start-up time is zero. Thus, in this case, the number-of-labels-issuable is assumed to be "zero." For example, the number-of-labels-issuable at the time t1 is "zero" in the table 1.

Preferably, the computing process of a number-of-labels-issuable is not performed when the battery BT is being charged or the printer 1 is printing, since a battery voltage tends to fluctuate.

Figure 6:
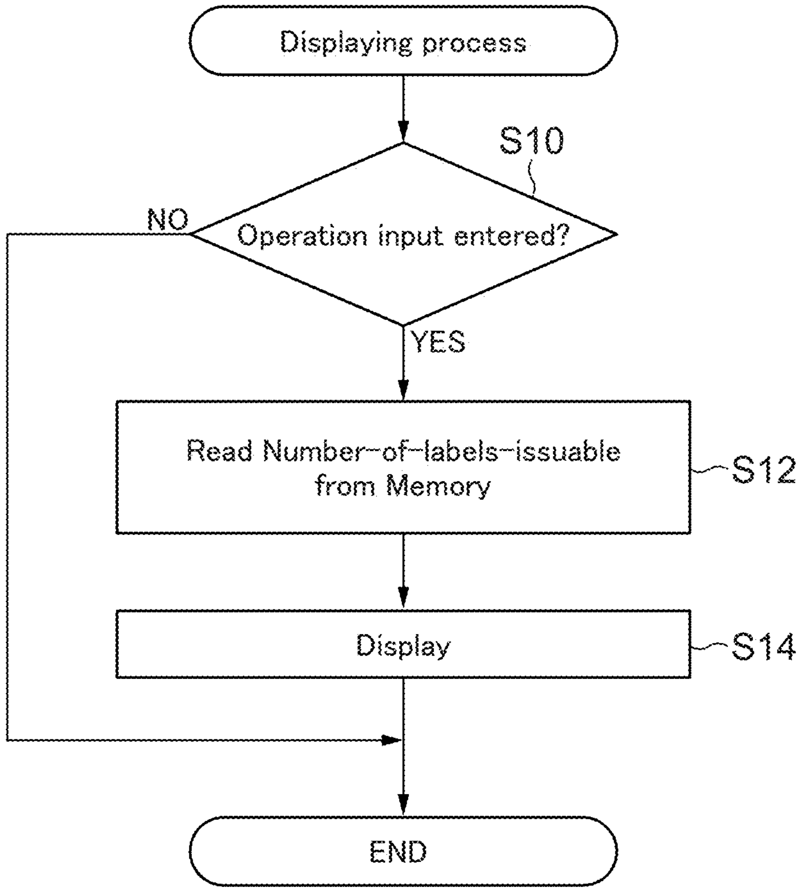
FIG. 6 is a flowchart indicating a displaying process in a printer according to an embodiment.

FIG. 6 shows a displaying process of a number-of-labels-issuable according to an embodiment of the printer 1. In this embodiment, the number-of-labels-issuable computed by the computing process of a number-of-labels-issuable in FIG. 4 is not readily displayed, but displayed in response to an operation input by a user to the printer 1.

That is, when entering an operation input by a user of the printer 1 (Step S10: YES), the control unit 11 reads the latest number-of-labels-issuable at the present from the memory inside the control unit 11 (Step S12), and controls the display unit 17 to display the number-of-labels-issuable (Step S14). That is, the control unit 11 controls the display unit 17 to display a number-of-labels-issuable that has been computed immediately before an operation input is entered. This prevents a bothersome displaying process that a number-of-labels-issuable is updated and displayed every time an SOC of the battery BT is decreased by a predetermined amount. A user can recognize a number-of-labels-issuable at the present by voluntarily operating the printer 1 when the user is concerned about the number-of-labels-issuable.

FIG. 6 is not intended to assume that a number-of-labels-issuable is displayed under a condition that a user has entered an operation input by a user. A number-of-labels-issuable may be displayed irrespective of whether a user has entered an operation input.

That is, the control unit 11 may control to display a number-of-labels-issuable every time an SOC of the battery BT is decreased by a predetermined amount. Thereby, a user can recognize the number-of-labels-issuable periodically.

In another embodiment, a number-of-labels-issuable may be displayed every time a battery voltage is decreased by a predetermined amount. In this case, it is determined at Step S2 of FIG. 4 whether a battery voltage has been decreased by the predetermined amount.

Figure 7:
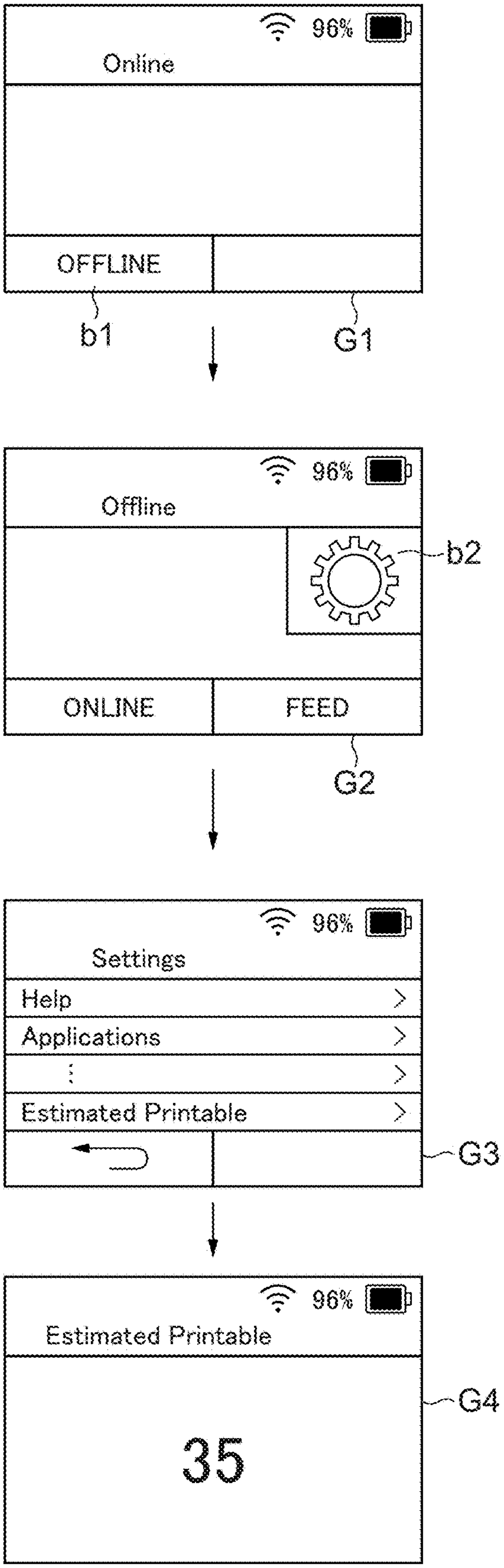
FIG. 7 represents displayed images including a number-of-labels-issuable in a printer according to an embodiment.

A method of entering an operation input by a user at Step S10 may be, but not limited to, entering an input to a button of the printer 1, or entering a selection input in a hierarchical manner from a menu screen of the printer 1. FIG. 7 shows an example in which a number-of-labels-issuable is displayed by entering a selection input in a hierarchical manner from a menu screen.

A screen image G1 represents an example of a home screen of the printer 1 in online operation. In this example, a user may firstly set the printer 1 to be offline by operating a button b1. In offline state, the printer 1 displays a home screen (a screen image G2) including a setting button b2. Then, in response to an operation of the setting button b2, a plurality of options regarding settings of the printer 1 is displayed (a screen image G3). When an option ("Estimate Printable") is selected among the plurality of options on the screen image G3, a number-of-labels-issuable ("35 pcs") is displayed as shown on a screen image G4.

Note that information regarding the number-of-labels-issuable is not updated while the screen image G4 remains displayed. If the screen image G4 is changed to another screen and the option ("Estimate Printable") is then selected again, information regarding the latest number-of-labels-issuable will be displayed at the time. However, an update method of the number-of-labels-issuable is not limited to this. Even if an operation input by a user is not performed while the screen image G4 remains displayed, the displayed number-of-labels-issuable may be updated every certain period of time.

In a case in which a number-of-labels-issuable is incomputable due to a total number of printed labels equal to zero, a text such as "0 pcs" or "Incomputable" may be displayed in the screen image G4.

In the embodiment explained with reference to FIGS. 4 and 5, a start-up time of the printer 1 is assumed to be a reference time for computing a number-of-labels-issuable. Then, a decrease in remaining battery capacity per single label is obtained by dividing remaining battery capacity that is decreased from the start-up time to the present time, by a number of labels that have been issued from the start-up time to the present time. However, a reference time is not limited to this. A reference time for computing a number-of-labels-issuable may be varied after the printer 1 is powered on.

In the embodiment explained with reference to FIGS. 4 and 5, computation of a number-of-labels-issuable is performed every time an SOC is decreased by predetermined ΔSOC; however, times for the computation are not limited to this. In another embodiment, computation of a number-of-labels-issuable may be performed every time a certain period of time has elapsed, every time a label has been issued, or every time a predetermined number of labels have been issued.

In an embodiment, the control unit 11 may determine the present time as a reference time for computing a number-of-labels-issuable, when the printer cover 25 is opened. That is, it is assumed that the paper roll R may be replaced when the printer cover 25 is opened. When the paper roll R is replaced, a label type may be changed. Accordingly, a feed distance for issuing a single label may be changed, and a layout of a printed content (e.g., coverage rate) may be largely changed. Consequently, a decrease in remaining battery capacity when a single label is issued, may be affected.

In view of the above, when the printer cover 25 is opened, a number of labels that have been issued so far, and a previously-obtained decrease in remaining battery capacity, may not be used for computing a decrease in remaining battery capacity per single label. Rather, a time when the printer cover 25 is opened may be determined as a reference time for computing a number-of-labels-issuable. That is, a number-of-labels-issuable is computed using a total number of printed labels and a decrease in remaining battery capacity that are obtained after the reference time newly determined. Thereby, computation accuracy for a decrease in remaining battery capacity per single label is improved after the printer cover 25 is opened. Consequently, computation accuracy for a number-of-labels-issuable is improved after the printer cover 25 is opened.

Note that opening of the printer cover 25 can be detected by locating an optical sensor for example.

In an embodiment, the control unit 11 may determine the present time as a reference time for computing a number-of-labels-issuable when the printer cover 25 is opened, in a condition that a prescribed operation input has been entered.

Even when the printer cover 25 is opened, a label type may not be changed and a layout of a printed content may be therefore largely changed. In this case, since a decrease in remaining battery capacity when a single label is issued, may not be affected by opening the printer cover 25, it is unnecessary to update a reference time for computing a number-of-labels-issuable. Besides, a user is aware of whether a label type is changed and whether a layout of a printed content is changed.

In view of the above, it may be determined, based on a user operation, whether a reference time for computing a number-of-labels-issuable is to be updated. In other words, a user may be able to perform setting as to whether a change of the reference time for computing a number-of-labels-issuable is enabled or disabled.

In an embodiment, when remaining battery capacity of the battery BT has largely decreased during a non-printing period (that is, a period of time during which printing is not performed), a number-of-labels-issuable may be displayed. That is, in an embodiment, when a decrease in remaining battery capacity of the battery BT during a non-printing period is greater than a predetermined value, the control unit 11 controls the display unit 17 to display a number-of-labels-issuable, with the remaining battery capacity of the battery BT at the time.

Electricity consumption for functions employed in the printer 1 may be large even in a non-printing period. For example, if a help video player is installed, electricity consumption becomes large when a user plays a help video. A help video is a video content configured to explain an instruction method for the printer 1, such as a method for replacing supplies in the printer 1, or a method for operating the printer 1.

When remaining battery capacity of the battery BT has largely decreased during a non-printing period, a number-of-labels-issuable may be displayed, which allows a user to remind the number-of-labels-issuable.

Figure 8:
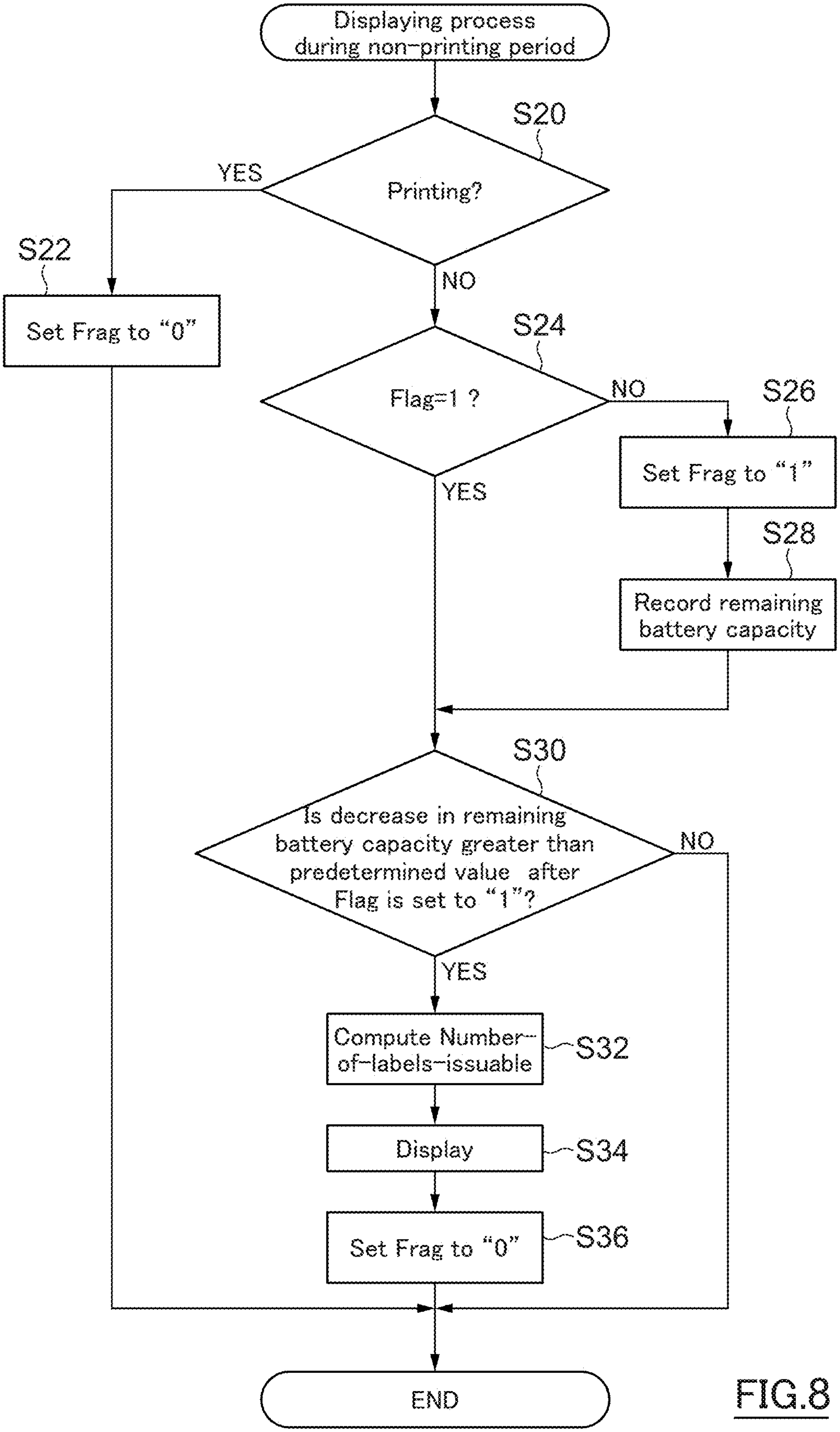
FIG. 8 is a flowchart indicating a displaying process during a non-printing period in a printer according to an embodiment.

FIG. 8 is a flowchart indicating a displaying process for a number-of-labels-issuable during a non-printing period.

First, when printing is being performed (Step S20: YES), the control unit 11 sets a flag to "0" (Step S22) and ends the process, since displaying a number-of-labels-issuable is not performed. The flag is data indicating whether the present time is in a non-printing period ("0": printing period, "1": non-printing period).

When printing is no longer performed (Step S20: NO), the control unit 11 determines whether the flag is "1" or not (Step S24). If the flag is determined to be not "1" at Step S24 (Step S24: NO), it is meant that the present time is immediately after a start time of a non-printing period. That is, according to the routine of FIG. 8, the flag is set to "0" during a printing period (Step S22: YES), and the flag is still "0" (Step S24: NO) in a routine immediately after the printing period has ended, while the printing is not being performed (Step S20: NO). In this case, the control unit 11 sets the flag to "1" (non-printing period) (Step S26) and records remaining battery capacity of the battery BT (Step S28). In Step S28, the remaining battery capacity of the battery BT is recorded at a start time of a non-printing period.

Figure 9:
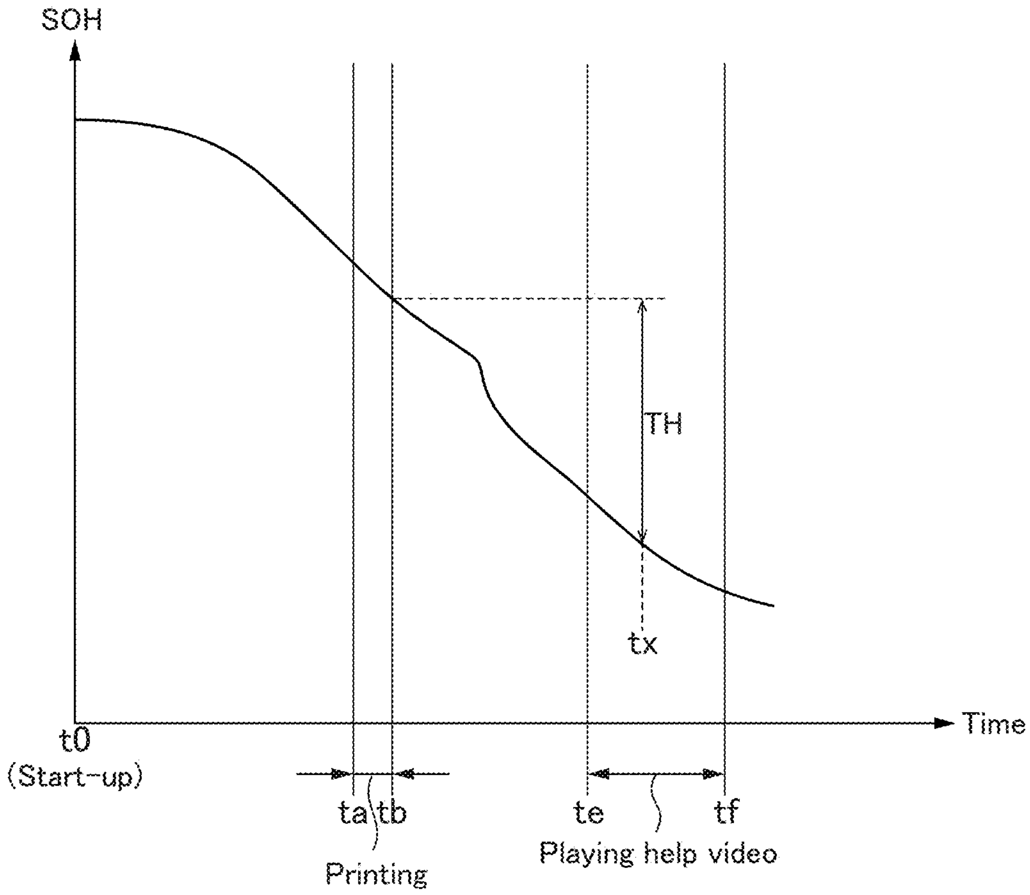
FIG. 9 represents a time when a number-of-labels-issuable is displayed in a printer according to an embodiment.

FIG. 9 shows variation of an SOC over time from a start-up time of the printer 1, which indicates an example different from FIG. 5. In FIG. 9, it is shown a case in which a user plays a help video during a period between a time "te" and a time "tf."

In an example shown in FIG. 9, the flag is set to "1" at a time "tb" that starts a non-printing period, and then the remaining battery capacity of the battery BT is recorded.

Once the flag is set to "1" (that is, during a non-printing period), the control unit 11 determines whether a decrease in the remaining battery capacity after the flag is set to "1" is greater than a predetermined value (an example of a first value) (Step S30). If the decrease in the remaining battery capacity is not greater than the predetermined value (Step S30: NO), the control unit 11 ends the process, since a condition is not satisfied for displaying a number-of-labels-issuable.

If the decrease in the remaining battery capacity is greater than the predetermined value (Step S30: YES), the control unit 11 computes a number-of-labels-issuable (Step S32) and controls the display unit 17 to display the computed number-of-labels-issuable (Step S34). In an example shown in FIG. 9, the decrease in the remaining battery capacity reaches a predetermined value TH at a time "tx" and the display unit 17 then displays the number-of-labels-issuable.

Figure 10:
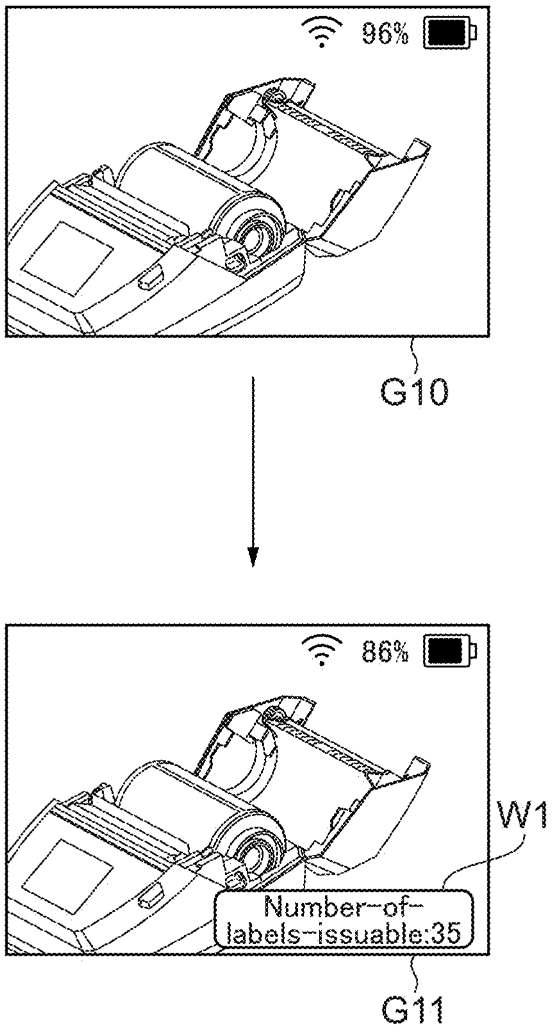
FIG. 10 represents displayed images including a number-of-labels-issuable in a printer according to an embodiment.

FIG. 10 represents an example of images displayed at Step S34.

FIG. 10 shows an example of a screen image G10 on which a help video is played by a user. If the decrease in the remaining battery capacity is greater than the predetermined value while the help video is played, a screen image G11 is displayed that includes a window W1 indicating a number-of-labels-issuable. A displaying period (that is, a duration time during which the number-of-labels-issuable is displayed) may be, but not limited to, a period that is recognizable by a user.

Referring again to the flowchart of FIG. 8, after controlling to display the number-of-labels-issuable, the control unit 11 sets the flag to "0" and ends the process (Step S36). Thereafter, when a non-printing period continues, the flag is set to "1" at Step S26 again. That is, when a non-printing period continues, printing is not performed (Step S20: NO) and the flag is "0" (Step S24: NO) immediately after the flag has been set to "0" at Step S36. Thus, the flag is set to "1" again. As a result, remaining battery capacity is newly recorded, and it is determined whether a decrease in the remaining battery capacity after the flag is set to "0" is greater than the predetermined value. That is, as long as a non-printing period continues, a number-of-labels-issuable is computed and displayed, every time the remaining battery capacity is decreased by a predetermined value.

In an embodiment, during a non-printing period, the control unit 11 may control display unit 17 to display a number-of-labels-issuable, when a decrease ratio of remaining battery capacity of the battery BT is greater than a predetermined value (an example of a second value). For example, in a state in which a voltage of the battery BT has relatively largely decreased in a short period of time due to help videos played consecutively, etc., a number-of-labels-issuable is displayed, which allows a user to remind the number-of-labels-issuable.

In this case, the control unit 11 monitors a decrease in remaining battery capacity of the battery BT in a past period from the present time, and determines whether a decrease ratio of the remaining battery capacity of the battery BT is greater than the predetermined value.

In the aforementioned embodiment, the printer 1 computes a decrease in remaining battery capacity per single label ("A") to obtain a number-of-labels-issuable. Meanwhile, the following steps may be applied in another embodiment: a decrease in remaining battery capacity per single label ("A") is recorded in a server; a printer accesses the server to obtain the decrease in remaining battery capacity per single label ("A"); and the printer then computes a number-of-labels-issuable. This embodiment will be described with reference to FIGS. 11 and 12.

Figure 11:
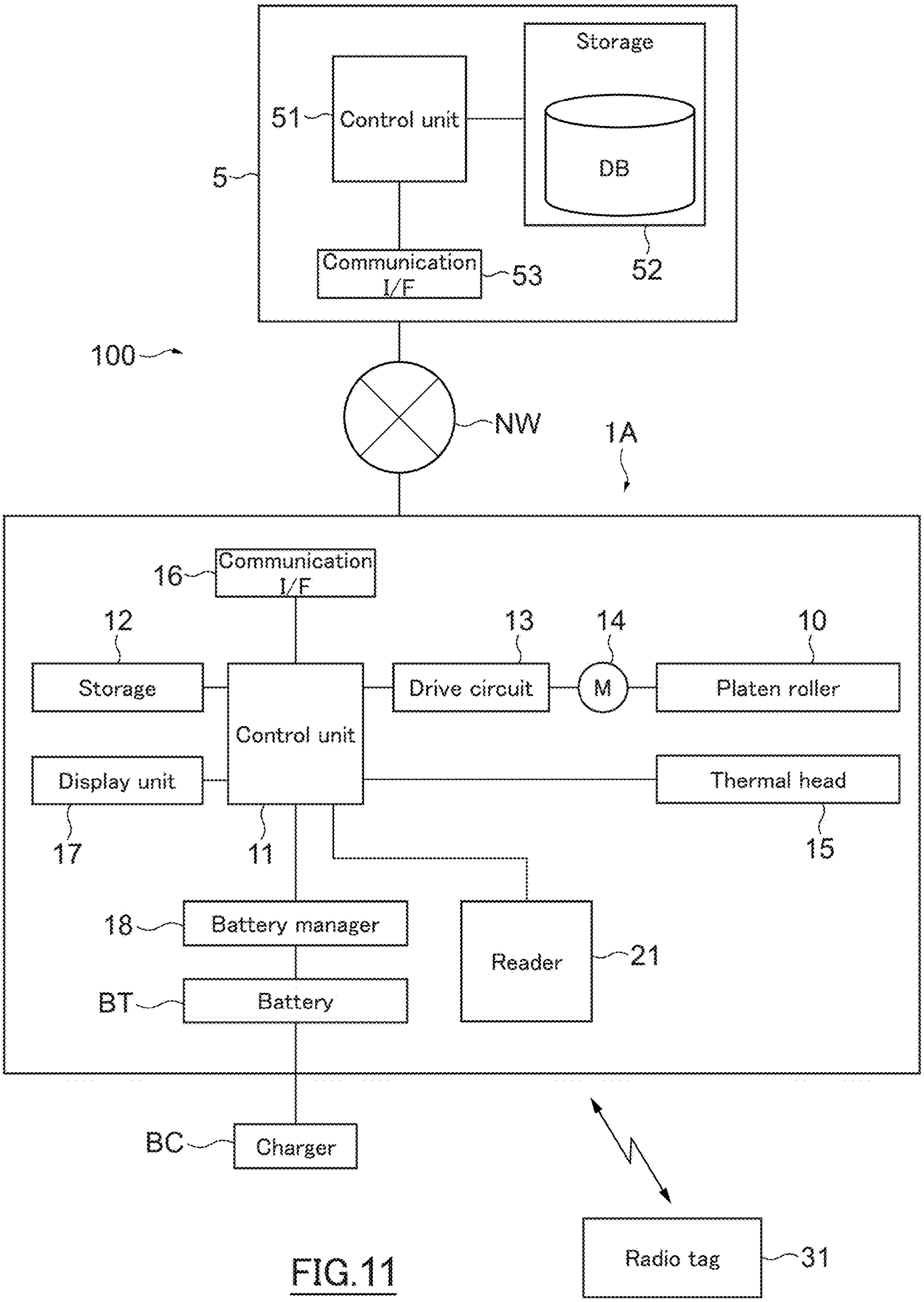
FIG. 11 is a block diagram to represent a schematic configuration of a printer system according to an embodiment.

FIG. 11 shows a block diagram indicating an overview of system configuration of a print system 100 according to an embodiment.

As shown in FIG. 11, a printer 1A and a server 5 are able to communicate with each other, through a network NW such as a local area network (LAN), a wide area network (WAN), or Internet.

Figure 12:
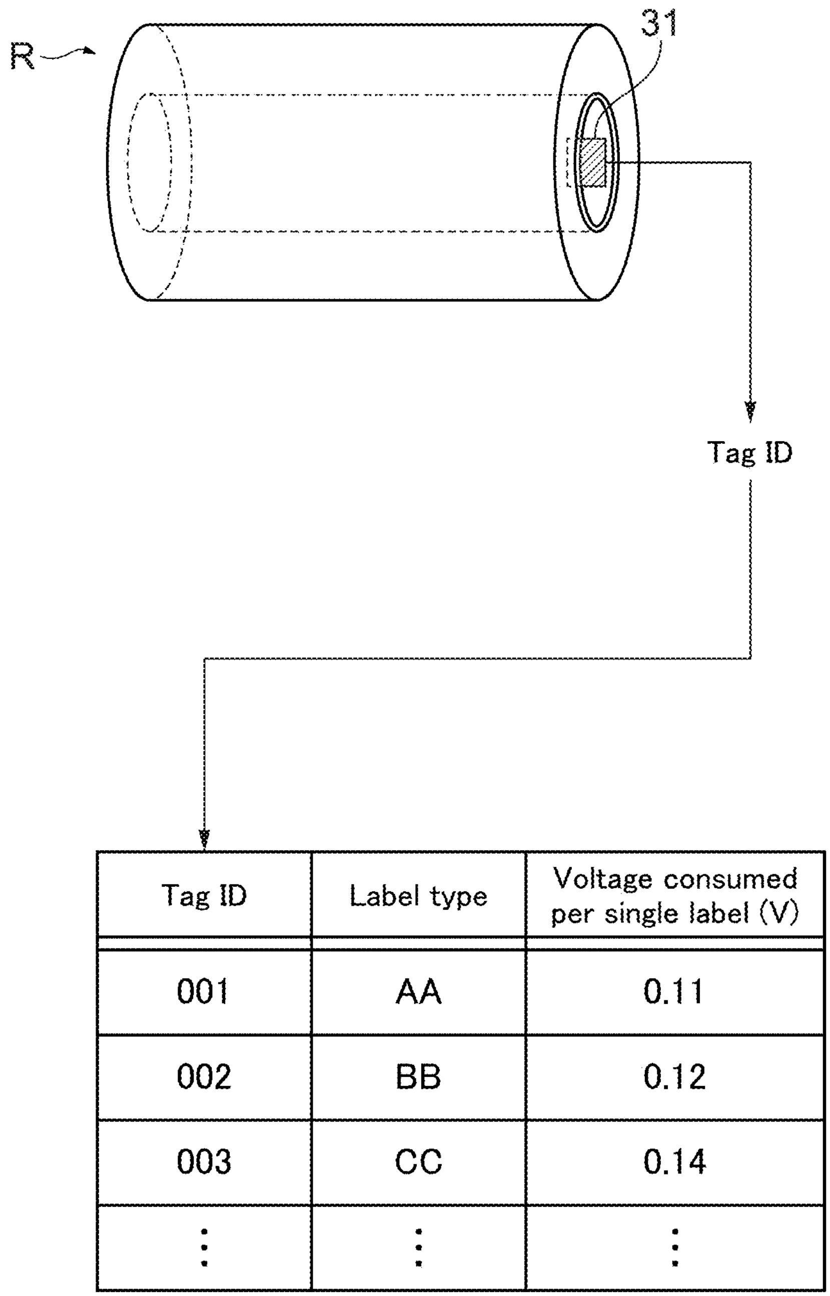
FIG. 12 represents a method for referring to a label database based on a tag ID.

The printer 1A is different from the printer 1 shown in FIG. 3, in that the printer 1A comprises a reader 21. As shown in FIG. 12, a label tag 31 is attached to a paper roll R used in the printer 1A. The label tag 31 is a radio tag such as a radio frequency identifier (RFID) tag and has a tag ID recorded therein for identifying a label type of the paper roll R to which the tag is attached. The reader 21 (an example of a tag reader) is configured to receive the tag ID of the label tag 31 attached to the paper roll R, in a state in which the paper roll R is set to the printer 1A.

As shown in FIG. 11, the server 5 is comprised of a control unit 51, a storage 52, and a communication interface (communication I/F) 53.

The control unit 51 is comprised of a microcomputer and memories (namely, a RAM and a ROM) to control operations of the server 5. The microcomputer loads from the ROM and executes a program when the server 5 is powered on.

The storage 52 (an example of a storage), which may be a device such as a hard disk drive (HDD), stores a label database exemplified in FIG. 12. As shown in FIG. 12, the label database includes, for example, a value for each of fields "Tag ID", "Label type", and "Voltage consumed per single label" in each record. Note that a record may be added to the label database as appropriate.

Considering that a layout of a printed content may be different and a voltage consumed per single label may therefore vary for each user, the label database may be preferably provided for each user. The server 5 may obtain, from the printer 1A, the past result of a voltage consumed per single label for a user, to update the database for each user.

The communication interface 53 has a communication circuit for communicating with the printer 1A.

In the print system 100, the reader 21 of the printer 1A reads the tag ID of the label tag 31 attached to the paper roll R being set in the printer 1, at a predetermined time (immediately after the start-up, for example), and then the control unit 11 of the printer 1A transmits an inquiry to the server 5. The inquiry includes the tag ID that has been read.

After receiving the inquiry, as schematically shown in FIG. 12, the server 5 refers to the label database to read out a value of a voltage consumed per single label which corresponds to the tag ID included in the inquiry, and returns the value to the printer 1A. Then, the printer 1A computes a number-of-labels-issuable based on the value of the voltage consumed per single label which is obtained immediately after the start-up.

In this way, the printer 1A obtains a decrease in remaining battery capacity per single label ("A"), from the server 5. Thereby, it is possible to compute a number-of-labels-issuable accurately in a continuous manner, even in a case in which the paper roll R is replaced with one of a different label type.

The embodiments of the printer, the print system, and the program according to the present invention have been described in details. However, scope of the present invention is not limited to the aforementioned embodiments described above. The aforementioned embodiments may be improved or modified in a variety of ways to such an extent that does not depart from the spirit of the present invention.

The present invention relates to a Japanese patent application No. 2021-29779 filed on Feb. 26, 2021 with the Japan Patent Office, entire content of which is incorporated into this specification by reference.

The invention claimed is:

1. A printer for issuing print media, comprising:
a rechargeable battery configured to supply power to the printer;
a print unit configured to print information on each of the print media;
a display unit; and
a control unit configured to:
compute "A" based on: a decrease in remaining battery capacity of the battery during a period of time from a reference time to the present time, and a total number of print media that have been issued during the period of time, where "A" is defined as remaining battery capacity of the battery decreased as a single print medium is issued;
compute (B−C)/A to obtain a number of print media on which the print unit can print, where "B" is defined as present remaining battery capacity of the battery, and "C" is defined as a lower limit of remaining battery capacity of the battery; and
upon determining that a decrease in remaining battery capacity of the battery is greater than a first value in a period of time during which printing is not performed by the print unit, control the display unit to display the number of print media on which the print unit can print with remaining battery capacity of the battery.

2. The printer according to claim 1, further comprising:
a cover configured to open or close a container that contains the print medium, wherein
the control unit is configured to define the reference time as a time when the cover is opened.

3. The printer according to claim 2, wherein
the control unit is configured to be placed in a setting in which the reference time is defined as the time when the cover is opened based on an operation input.

4. The printer according to claim 1, wherein
the control unit is configured to control the display unit to display the number of print media, when a decrease ratio of remaining battery capacity of the battery is greater than a second value in a period of time during which printing is not performed by the print unit.

5. A print system comprising:
the printer according to claim 1; and
a server, wherein
a radio tag is attached to the print media, the radio tag having identification information recorded therein for identifying a type of the print media among a plurality of types of print media,
the printer further comprises:
a tag reader configured to read identification information of the radio tag; and a communication part configured to communicate with the server, the server comprises a storage configured to record the "A" for each of the plurality of types of print media, and the control unit of the printer is configured to obtain, from the server, the "A" for a type of print media corresponding to the identification information read by the tag reader.

6. A non-transitory recording medium that stores a program that causes a computer to perform a method when installed in a printer that comprises a print unit and a display unit and operates with a rechargeable battery to issue print media, the method comprising:

computing "A" based on: a decrease in remaining battery capacity of the battery during a period of time from a reference time to the present time, and a total number of print media that have been issued during the period of time, where "A" is defined as remaining battery capacity of the battery decreased as a single print medium is issued;

computing (B−C)/A to obtain a number of print media on which the print unit can print, where "B" is defined as present remaining battery capacity of the battery, and "C" is defined as a lower limit of remaining battery capacity of the battery; and controlling the printer to, upon determining that a decrease in remaining battery capacity of the battery is greater than a first value in a period of time during which printing is not performed by the print unit, control the display unit to display the number of print media on which the print unit can print with remaining battery capacity of the battery.

7. The printer according to claim 2, wherein the control unit is configured to control the display unit to display the number of print media, when a decrease ratio of remaining battery capacity of the battery is greater than a second value in a period of time during which printing is not performed by the print unit.

8. A printer for issuing print media, comprising:

a rechargeable battery configured to supply power to the printer;

a print unit configured to print information on each of the print media;

a display unit;

a cover configured to open or close a container that contains the print medium; and a control unit configured to:

compute "A" based on: a decrease in remaining battery capacity of the battery during a period of time from a reference time to the present time, and a total number of print media that have been issued during the period of time, where the reference time as a time when the cover is opened, and where "A" is defined as remaining battery capacity of the battery decreased as a single print medium is issued;

compute (B−C)/A to obtain a number of print media on which the print unit can print, where "B" is defined as present remaining battery capacity of the battery, and "C" is defined as a lower limit of remaining battery capacity of the battery; and control the display unit to display the number of print media.

9. The printer according to claim 8, wherein the control unit is configured to be placed in a setting in which the reference time is defined as the time when the cover is opened based on an operation input.

* * * * *